United States Patent
King et al.

(10) Patent No.: US 8,573,199 B2
(45) Date of Patent: Nov. 5, 2013

(54) ULTRASONIC IN SITU RESPIRATORY MASK TESTING PROCESS AND MASK

(75) Inventors: William Porter King, Washington, PA (US); Jonathan Szalajda, Pittsburgh, PA (US)

(73) Assignee: Centers for Disease Control and Prevention, Atlanta, GA (US)

( * ) Notice: Subject to any disclaimer, the term of this patent is extended or adjusted under 35 U.S.C. 154(b) by 162 days.

(21) Appl. No.: 13/098,980

(22) Filed: May 2, 2011

(65) Prior Publication Data

US 2011/0270085 A1 Nov. 3, 2011

Related U.S. Application Data

(60) Provisional application No. 61/329,846, filed on Apr. 30, 2010.

(51) Int. Cl.
| | | |
|---|---|---|
| *A62B 27/00* | (2006.01) | |
| *A62B 18/08* | (2006.01) | |
| *A62B 7/10* | (2006.01) | |
| *A62B 18/02* | (2006.01) | |
| *G01M 3/24* | (2006.01) | |
| *G01N 29/00* | (2006.01) | |

(52) U.S. Cl.
USPC ............ 128/202.22; 128/206.12; 128/206.19; 128/206.21; 128/206.28; 73/40; 73/592

(58) Field of Classification Search
USPC ......... 128/206.12–19, 206.21, 202.22; 73/40, 73/0.5 A, 40.5 R, 592
See application file for complete search history.

(56) References Cited

U.S. PATENT DOCUMENTS

| | | | |
|---|---|---|---|
| 4,674,492 A * | 6/1987 | Niemeyer | 128/202.22 |
| 4,765,325 A | 8/1988 | Crutchfield | |
| 4,846,166 A | 7/1989 | Willeke | |
| 4,914,957 A | 4/1990 | Dougherty | |
| 5,103,675 A * | 4/1992 | Komninos | 73/592 |
| 5,231,866 A * | 8/1993 | Peacock | 73/40.5 A |
| 5,617,849 A * | 4/1997 | Springett et al. | 128/206.24 |
| 6,125,845 A | 10/2000 | Halvorsen et al. | |
| 6,430,988 B1 * | 8/2002 | Watanabe | 73/40.5 A |
| 7,325,441 B2 | 2/2008 | Liu et al. | |
| 7,415,864 B1 | 8/2008 | Israel et al. | |
| 8,011,368 B2 | 9/2011 | Crutchfield | |
| 2004/0163648 A1 * | 8/2004 | Burton | 128/204.21 |
| 2006/0174883 A1 * | 8/2006 | Aylsworth et al. | 128/204.21 |
| 2011/0313689 A1 * | 12/2011 | Holley et al. | 702/56 |

FOREIGN PATENT DOCUMENTS

JP 9043360 2/1997

* cited by examiner

*Primary Examiner* — Justine R Yu
*Assistant Examiner* — Douglas Sul
(74) *Attorney, Agent, or Firm* — Gifford, Krass, Sprinkle, Anderson & Citkowski, P.C.

(57) ABSTRACT

A respiratory mask includes a mask body with a perimeter. The mask has a use position wherein the mask body covers at least the mouth and nose and the perimeter is in contact with the face surrounding at least the mouth and nose. At least one ultrasonic sensor is supported on the mask body in detecting proximity to the perimeter. The ultrasonic sensor is operable to detect ultrasound. The ultrasonic sensor allows leakage around the perimeter of the mask body to be detected.

17 Claims, 4 Drawing Sheets

ULTRASONIC IN SITU RESPIRATORY MASK TESTING PROCESS AND MASK

CROSS REFERENCE TO RELATED APPLICATIONS

This U.S. utility patent application claims priority from U.S. provisional patent application Ser. No. 61/329,846, filed Apr. 30, 2010, the entire content of which is incorporated herein in its entirety.

GOVERNMENT INTEREST

This invention was made by the Centers for Disease Control and Prevention, an agency of the United States Government. Therefore, the United States Government has certain rights in this invention.

FIELD OF THE INVENTION

This invention relates to an apparatus and a process for testing seal integrity in situ of a subject wearing a respiratory mask and in particular to the use of ultrasonics in such testing.

BACKGROUND OF THE INVENTION

A negative pressure respirator mask typically is leak tested by covering the air inlet and inhaling until the mask is slightly collapsed. A positive pressure respirator is similarly leak tested by covering the air outlet and exhaling until the mask bulges. These tests of time holding pressure are both subjective and static in that the quality of the mask seal (and other potential leak paths including valves) as a function of time is not measured. Quantitative testing estimates fit (the inverse of leakage) for a specific model of mask and individual wearer. While of considerable advantage in mask selection and design, the usage of aerosol flow, and other conventional techniques, renders quantitative leak testing techniques incompatible with in situ field use.

Thus, there exists a need for an in situ apparatus and process for testing a respiratory mask seal during actual usage. Such an apparatus and process could continuously monitor fit (leakage) and be used to alert the wearer to mask failure.

SUMMARY OF THE INVENTION

The present invention provides a respiratory mask to be used on the face of the user such that the mask covers at least the mouth and nose of the user. The mask includes a mask body with a perimeter. The mask has a use position wherein the mask body covers at least the mouth and nose on the face of the user and the perimeter (face seal) of the mask body is in contact with the face surrounding at least the mouth and nose. At least one ultrasonic sensor is supported on the mask body in detecting proximity to the perimeter. The ultrasonic sensor is operable to detect ultrasound. The ultrasonic sensor allows leakage around the perimeter of the mask body to be detected. In some versions, the respiratory mask further includes a power source for powering at least one ultrasonic sensor and a microprocessor in electrical communication with the at least one ultrasonic sensor. The microprocessor is operable to process the signal from the ultrasonic sensor.

In some embodiments, the mask body further comprises a flexible perimeter face seal defining the perimeter of the mask body.

In some versions, the ultrasonic sensor is a microphone. In further versions, the at least one ultrasonic sensor is a plurality of ultrasonic sensors, each sensor being disposed adjacent the perimeter of the mask body. These ultrasonic sensors may be supported so as to extend outwardly beyond the perimeter.

In some embodiments, the mask body is an elastomeric body with a seal at the perimeter and the mask further comprises at least one filter element attached to the mask body. In other embodiments, the mask body is a body of filtration material. In further versions, the mask body is a full face mask configured to cover the mouth, nose and eyes of the user.

In some embodiments, at least one ultrasonic sensor is a first ultrasonic sensor and the mask further includes a second ultrasonic sensor supported on an innerface of the mask body. The second ultrasonic sensor is a reference sensor. A microprocessor is in electrical communication with the first and second sensors and is operable to compare a signal from the first and second sensors and to determine a parameter corresponding to leakage around the perimeter.

In some embodiments, mask further includes an ultrasound source disposed on an innerface of the mask body.

Some embodiments of the present invention include a microprocessor in electrical communication with at least one ultrasonic sensor. The microprocessor is operable to process a signal from the sensor and to determine a parameter corresponding to leakage around the perimeter. The microprocessor is further operable to produce an alarm signal if the ultrasound corresponds to leakage exceeding a predetermined level.

A method in accordance with the present invention includes providing a respiratory mask as described above. The mask is positioned on the face of the user such that the mask body covers at least the mouth and nose of the user and the perimeter of the mask body is in contact with the face surrounding at least the mouth and nose. A signal is received from the at least one ultrasonic sensor. In further versions, the signal is correlated with the measured level of leakage. In yet further versions, an alarm signal is provided if the signal from the ultrasonic sensor corresponds to leakage exceeding a predetermined level. In some embodiments of the method, nasal respiration of the user produces ultrasonic waves for detection by the ultrasonic sensors.

DETAILED DESCRIPTION OF THE INVENTION

The present invention has utility in the testing and improved operation of respiratory masks (respirators). Such masks are commonly used in settings as diverse as chemical handling, firefighting, chemical and biological weapon defense, surgery, and biohazard handling. Based on the specifics of the user's face, the operating environment, age and composition of the mask, and user actions, a mask seal and other potential leak paths can fail in an unpredictable manner, thereby exposing a subject wearing the mask to the very conditions the mask was intended to preclude. To address the limitations of prior art mask testing, the presenting invention relies on ultrasonic wave detection to assess face seal quality and other potential leak paths as needed. In a preferred embodiment, the present invention relies on the surprising discovery that sinusoidal respiration through the nose of a subject operates as a source of ultrasonic waves that can be detected by at least one microphone or sensor in detecting proximity to the mask's perimeter. Alternatively, an ultrasound source is positioned internal to the mask seal and at least one microphone or sensor is positioned in detecting proximity to the mask seal or other potential leak path. As a result of small size, low energy consumption, and the omission of field use incompatible seal testing substances, the present invention is operative in situ during actual field usage of the mask by a subject to provide greater safety to the subject wearing the mask and also to facilitate further mask design with improved seal properties. It is appreciated that microphone or sensor data can be stored and correlated with subject activity to provide dynamic seal properties and can further be manipulated to provide integrated values of seal comprise. These integrated values are particular helpful in mask seal design and when coupled with a subject alarm can alert a subject when a threshold of environmental exposure has been reached.

A subject that benefits from the present invention illustratively includes a human; non-human primate; and domesticated animals such as a dog, cat, horse, sheep, cow, rat, mouse, and rabbit.

Figure 1:
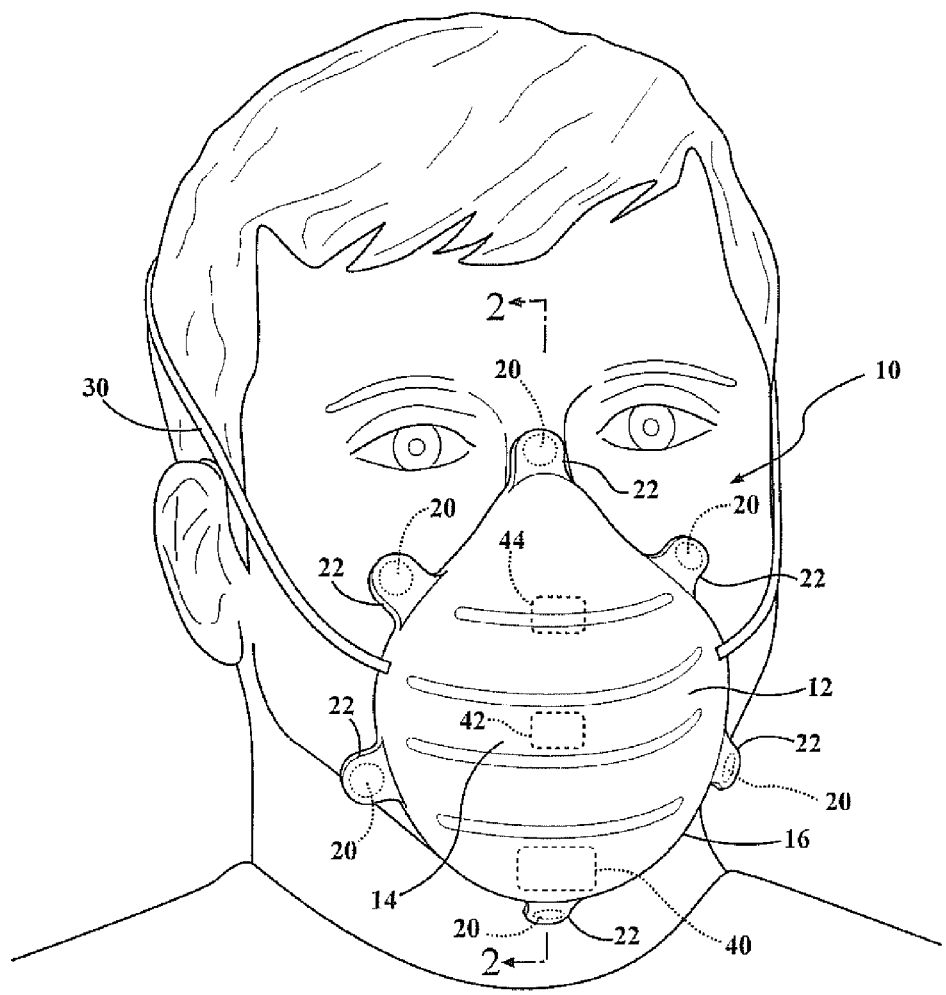
FIG. 1 is a perspective view of a mask in accordance with an embodiment of the present invention is a use position on a user's face.
Figure 2:
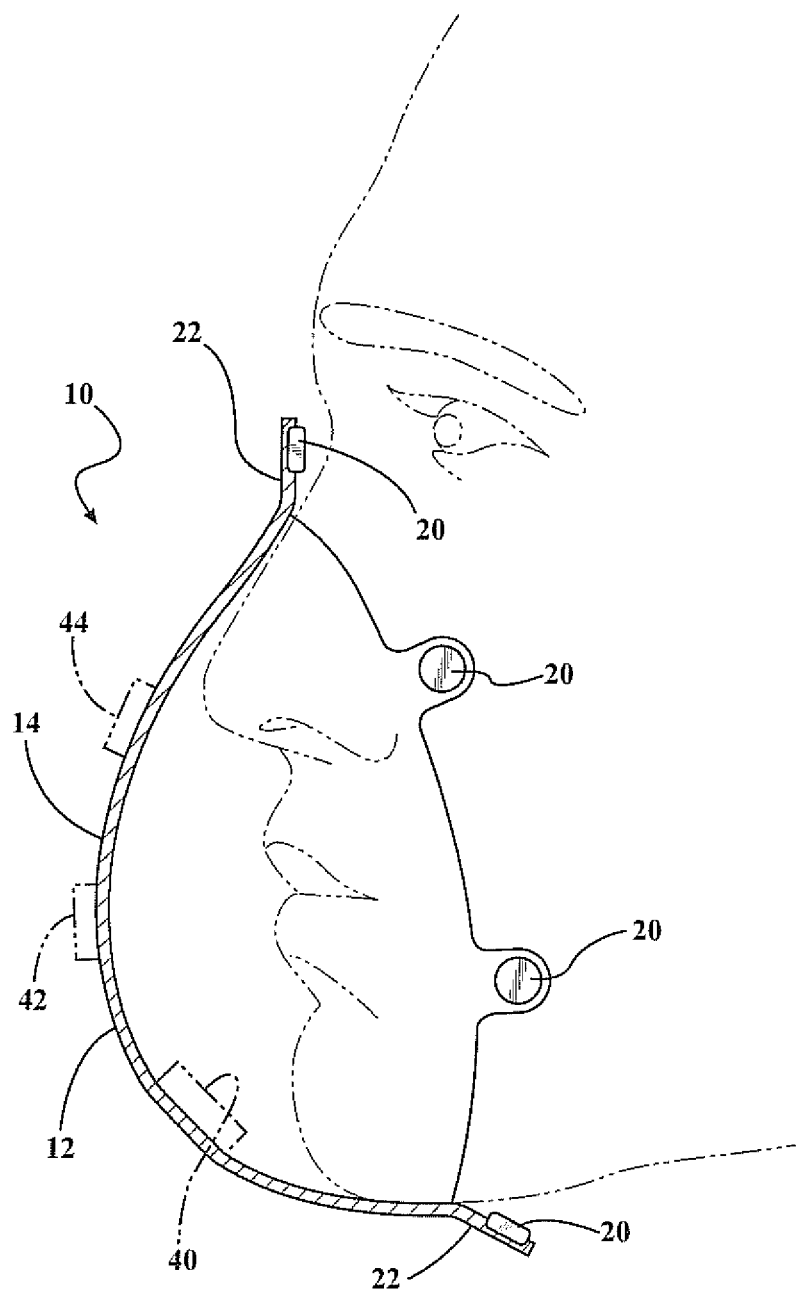
FIG. 2 is a cross-sectional view of the mask of FIG. 1 taken along lines 2-2.

Referring to FIGS. 1 and 2, a mask 10 in accordance with an embodiment of the present invention is shown on the face of a user. The mask 10 has a mask body 12 with the central area 14 and a perimeter 16. The mask may be said to have a use position wherein the mask body 14 covers the mouth and nose on the face of a user and the perimeter 16 is in contact with the face surrounding at least the mouth and nose. The mask 10 is illustrated in such a use position in FIGS. 1 and 2. As known to those of skill in the art, it is preferred that the perimeter 16 be sealingly engaged with the skin of the user so that substantially all of the respiration of the user passes through the mask itself rather than leaking between the perimeter and the face.

In the illustrated embodiment, the mask 10 further includes a plurality of ultrasonic sensors each disposed in detecting proximity to the perimeter 16 of the mask. In the illustrated embodiment, the ultrasonic sensors 20 are supported adjacent the perimeter. The sensors are supported on support tabs 22 that extend outward of the perimeter so as to be in position for sensing ultrasound that passes between the perimeter and the face.

As known to those of skill in the art, the ultrasonic sensors 20 may take a variety of forms, including ultrasonic microphones or other types of ultrasonic sensors. In alternative embodiments, the sensors may be positioned differently than shown. For example, in the illustrated embodiment, the sensors are on the inner surface of the tabs 22. They may instead be on an outer surface, or may be supported in other ways. Further, the sensors may be inboard of the perimeter edge, such as in the central area 14 if such positioning allows sensing of ultrasound past the perimeter. The illustrated embodiment of the mask 10 includes six ultrasonic sensors 20, though alternative embodiments may include fewer or more ultrasonic sensors. In the illustrated embodiment, a sensor 20 is positioned at the bridge of the nose of the user, two sensors are positioned to the sides of the nose on the upper cheek, one sensor is positioned below the chin, and two sensors are positioned to the sides of the mouth of the user on the lower cheek. This positioning is preferred for some embodiments, but may be altered in other embodiments.

As shown in FIG. 1, the mask may further include a retaining strap 30 for holding the mask in the use position. The retaining strap may take other forms.

Experiments by the inventors have demonstrated that inhalation and exhalation through the nasal passages of a user creates an ultrasonic signal that may be utilized with the present invention. As discussed above, the present invention is configured to sense ultrasound as an indication of leakage between the perimeter of a mask and the face of a user. In embodiments of the present invention utilizing an ultrasonic signal produced by inhalation and exhalation of the user, an additional ultrasound source may not be required. However, the amount of ultrasound produced by inhalation and exhalation may vary depending on the breathing conditions and characteristics of the user. As such, in some embodiments, it is desirable to provide a reference sensor for measuring the ultrasound produced within the mask. Such an optional ultrasonic sensor is illustrated at 40 in FIGS. 1 and 2. This reference sensor 40 may be an ultrasonic sensor positioned on an inner surface of the mask. By comparing the signal received by the reference sensor 40 and the sensors 20, relative leakage may be determined. Though not illustrated in FIGS. 1 and 2, the sensors 20, and optional reference sensor 40, are in electrical communication with a microprocessor and the microprocessor is operable to process a signal from the sensors. In some embodiments, the microprocessor is operable to compare a signal from the sensors 20 and the reference sensor 40 to determine a parameter corresponding to leakage around the perimeter of the mask.

In further embodiments, it may be desirable to provide an ultrasonic source such that the mask is not reliant on ultrasound produced by inhalation and exhalation of the user. In such an embodiment, the element 40 may indicate such an ultrasound source. Further, the element 40 may indicate both an ultrasound source and a reference sensor in embodiments where both are desirable. In embodiments where element 40 is an ultrasound source, the source 40 creates a known level of ultrasound in the interior of the mask body 12. A microprocessor may be in electrical communication with both the source 40 and the sensors 20 and operable to determine a parameter corresponding to leakage around the perimeter by comparing the known level of ultrasound from the source 40 to the amount of ultrasound sensed by the sensors 20.

As known to those of skill in the art, depending on the configuration of the mask body 12, some ultrasound may pass through the body 12 without leaking past the perimeter. For this reason, some embodiments may include an optional reference sensor 42 disposed exterior to the mask and operable to sense ultrasound that passes through the mask body. In the illustrated embodiment, this optional reference sensor 42 is positioned in the central area 14 of the mask body. By comparing the amount of ultrasound sensed by the reference sensor 42 with the amount of ultrasound sensed by the sensors 20, the microprocessor may determine a parameter corresponding to leakage at the perimeter. In some embodiments, the sensor 42 may be provided in combination with the element 40, which may be a source and/or a sensor.

While the illustrated embodiment assumes sensing of ultrasound produced inside the mask by sensors exterior to the mask, the configuration may be reversed such that a source is provided exterior to the mask and sensing of ultrasound leaking past the perimeter is sensed interior to the mask. For example, element 42 may be an ultrasound source.

Alternatively, the sensors 20 may represent sources with ultrasound being sensed interior to the mask, such as by a sensor 40.

It is desirable to inform a user if leakage is detected and/or if such leakage is above a predetermined safe level. As such, the mask 10 may optionally include an alarm such as indicated by element 44. The alarm may be an audible and/or visual indicator that the microprocessor has determined that the level of ultrasound sensed by the perimeter sensors is above a predetermined level. Optionally, the alarm may indicate which sensor is sensing the excessive level so as to assist in adjusting of the mask for better fit. Multiple indicators may be provided.

Figure 3:
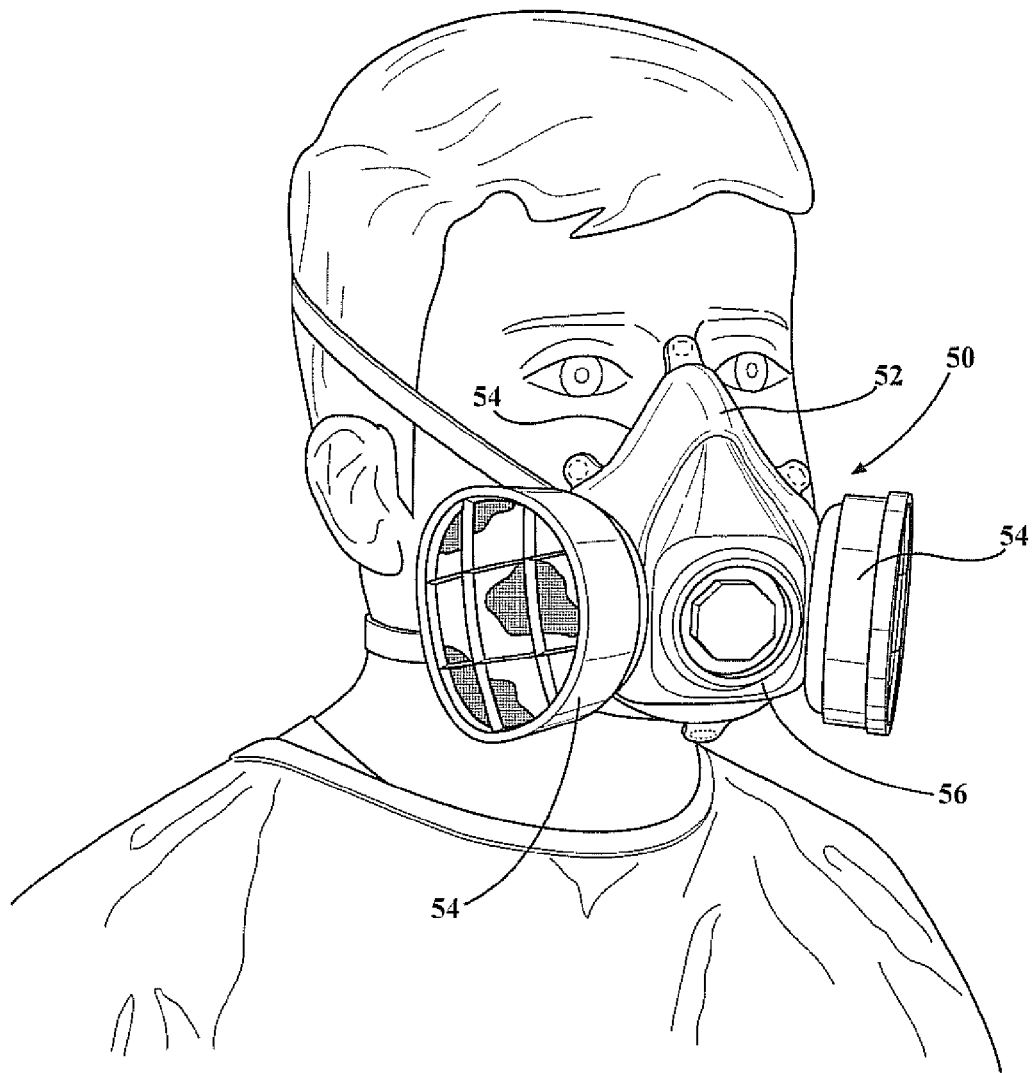
FIG. 3 is a perspective view of an alternative embodiment of a mask in accordance with the present invention.

Referring now to FIG. 3, an alternative embodiment of a mask 50 is shown on the face of a user. The mask 50 may be known as a half-mask and is designed to cover the mouth and nose of a user. It typically includes an elastomeric mask body 52 with a flexible perimeter seal 54 for sealing to the face of the user. The mask 50 may include one or more filter elements 54 attached to the mask body for filtering inhalations. An exhalation valve 56 may also be provided. The mask 50 may otherwise be constructed in accordance with the discussion of FIGS. 1 and 2.

Figure 4:
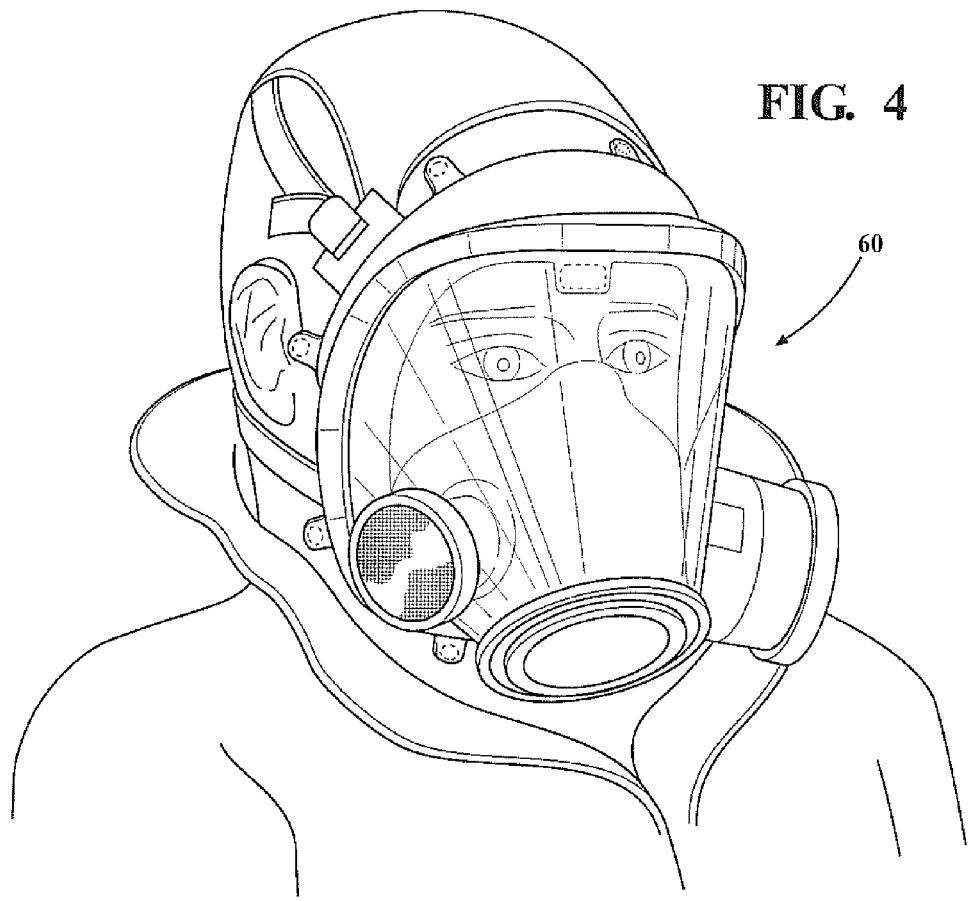
FIG. 4 is a perspective view of another mask in accordance with a further embodiment of the present invention.

Referring now to FIG. 4, a further embodiment of the mask 60 is illustrated. This mask is a full face type mask designed to cover the entire face of the user. It may be otherwise constructed in accordance with the discussion of FIGS. 1 and 2.

Figure 5:
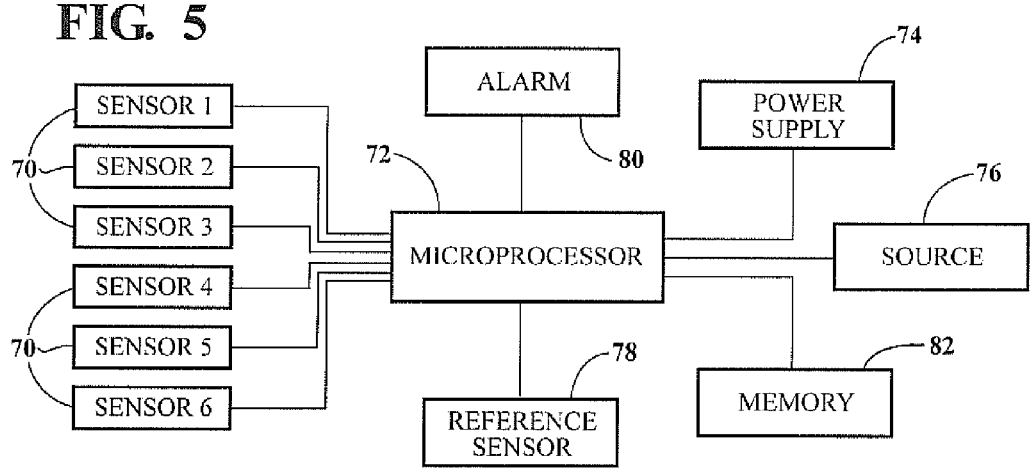
FIG. 5 is a block diagram illustrating components that may form part of an embodiment of the present invention.

FIG. 5 provides a block diagram of components that may be included in some embodiments of the present invention. The system may include a plurality of ultrasonic sensors 70 each in electrical communication with the microprocessor 72. A power supply may supply power to the microprocessor. Alternatively, the system may be powered by an external source, such as plugging the mask into a power source already being carried by the user. As discussed previously, the system may include an ultrasound source 76 and/or a reference ultrasonic sensor 78. Some embodiments may also include an alarm 80 for alerting a user when leakage exceeds a predetermined level. In some embodiments, the microprocessor may have a memory 82 for storing information concerning leakage. This may be desirable such that a mask may be checked after use to determine how much leakage occurred, when and where the leakage occurred, and other factors.

The present invention also includes a method of using a mask as described above. Such a mask is disposed on the face of the user, or on a testing form, and a signal is received from at least one ultrasonic sensor. The system may be used to correlate an ultrasonic signal with a level of leakage determined using any other method. For example, the ultrasonic signal may be correlated with leakage determined using an aerosol flow test. In some embodiments of the method, respiration of the user produces the ultrasonic waves for detection by the ultrasonic sensors.

As will be clear to those of skill in the art, the herein described embodiments of the present invention may be altered in various ways without departing from the scope or teaching of the present invention. It is the following claims, including all equivalents, which define the scope of the present invention.

The invention claimed is:

1. A respiratory mask to be used on the face of a user such that the mask covers at least the mouth and nose of the user, the mask comprising:
   a mask body with a perimeter, the mask having a use position wherein the mask body covers at least the mouth and nose on a face of a user and the perimeter of the mask body is in contact with the face surrounding at least the mouth and nose;
   at least one ultrasonic sensor supported on the mask body in detecting proximity to the perimeter, the ultrasonic sensor operable to detect ultrasound; wherein the at least one ultrasonic sensor is disposed outboard away from the perimeter of the mask body; and
   wherein the ultrasonic sensor allows leakage around the perimeter of the mask body to be detected.

2. A respiratory mask in accordance with claim 1, further comprising:
   a power source for powering the at least one ultrasonic sensor; and
   a microprocessor in electrical communication with the at least one ultrasonic sensor, the microprocessor operable to process a signal from the ultrasonic sensor.

3. A respiratory mask in accordance with claim 1, wherein: the mask body further comprises a flexible perimeter seal defining the perimeter of the mask body.

4. A respiratory mask in accordance with claim 1, wherein: the ultrasonic sensor is a microphone.

5. A respiratory mask in accordance with claim 1, wherein: the at least one ultrasonic sensor comprises a plurality of ultrasonic sensors, each disposed radially outboard from the perimeter.

6. A respiratory mask in accordance with claim 1, where: the mask body is an elastomeric body with a seal at the perimeter; and
   the mask further comprising at least one filter element attached to the mask body.

7. A respiratory mask in accordance with claim 1, wherein: the mask body is a body of filtration material.

8. A respiratory mask in accordance with claim 1, wherein: the mask body is a full face mask configured to cover the mouth, nose and eyes of a user, the mask body having a perimeter seal.

9. A respiratory mask in accordance with claim 1, wherein: the at least one ultrasonic sensor is a first ultrasonic sensor;
   the mask further comprising a second ultrasonic sensor supported on an inner face of the mask body, the second ultrasonic sensor being a reference sensor; and
   a microprocessor in electrical communication with the first and second sensors and operable to compare a signal from the first and second sensors and to determine a parameter corresponding to leakage around the perimeter.

10. A respiratory mask in accordance with claim 1, further comprising:
    an ultrasound source disposed on an inner face of the mask body.

11. A respiratory mask in accordance with claim 1, further comprising:
    a microprocessor in electrical communication with the at least one ultrasonic sensor and operable to process a signal from the sensor and to deteimine a parameter corresponding to leakage around the perimeter, the microprocessor further operable to produce an alarm signal if the ultrasound corresponds to leakage exceeding a predetermined level.

12. A method for testing leakage past a perimeter of a respiratory mask, comprising:
    providing the respiratory mask in accordance with claim 1;
    positioning the respiratory mask on the face of a user such that the mask body covers at least the mouth and nose of the user and the perimeter of the mask body is in contact with the face surrounding at least the mouth and nose; and receiving a signal from the at least one ultrasonic sensor.

13. A method for testing leakage past a perimeter of a respiratory mask in accordance with claim 12, further comprising:

correlating the signal with a measured level of leakage.

14. A method for testing leakage past a perimeter of a respiratory mask in accordance with claim 12, further comprising:

providing an alarm signal if the signal from the at least one ultrasonic sensor corresponds to a leakage exceeding a predetermined level.

15. A method for testing leakage past a perimeter of a respiratory mask in accordance with claim 12, wherein:

nasal respiration of the user produces ultrasonic waves for detection by the ultrasonic sensors.

16. A respiratory mask to be used on the face of a user such that the mask covers at least the mouth and nose of the user, the mask comprising:

a mask body having a central area and a perimeter, the mask having a use position wherein the mask body covers at least the mouth and nose on a face of a user and the perimeter of the mask body is in contact with the face surrounding at least the mouth and nose;

a plurality of ultrasonic sensors each supported on the mask body, the ultrasonic sensors each being disposed adjacent the perimeter of the mask body and in detecting proximity to the perimeter, the ultrasonic sensors each operable to detect ultrasound; wherein each of the plurality of ultrasonic sensors are disposed radially outboard away from the perimeter of the mask body; and a microprocessor in electrical communication with each of the ultrasonic sensors, the microprocessor receiving a signal from each of the ultrasonic sensors and processing the signals to produce an output parameter corresponding to leakage at the perimeter of the mask body.

17. A respiratory mask in accordance with claim 16, further comprising:

a reference sensor operable to detect ultrasound, the reference sensor being supported on the mask body; and the microprocessor further being in electrical communication with the reference sensor and operable to compare the signals from the plurality of ultrasonic sensors with a signal from the reference sensor.

* * * * *